July 30, 1946.　　　　L. A. KILGORE ET AL　　　　2,404,965
OSCILLATION GENERATING SYSTEM
Filed Jan. 12, 1944　　　　2 Sheets-Sheet 1

WITNESSES:

INVENTORS
Lee A. Kilgore and
Harry E. Criner.
BY
Paul E. Friedemann
ATTORNEY

July 30, 1946.  L. A. KILGORE ET AL  2,404,965
OSCILLATION GENERATING SYSTEM
Filed Jan. 12, 1944  2 Sheets—Sheet 2
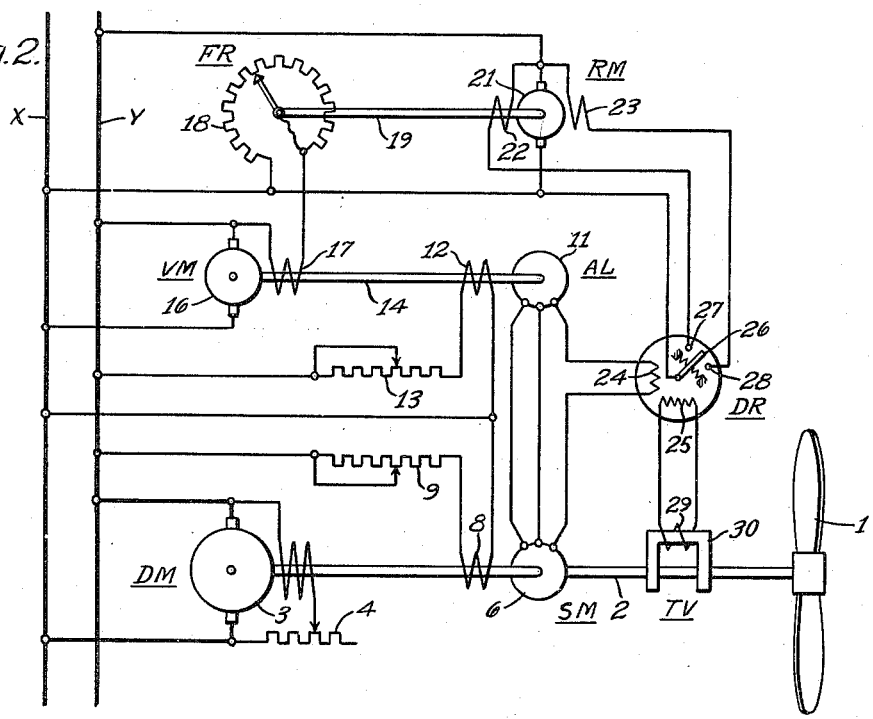
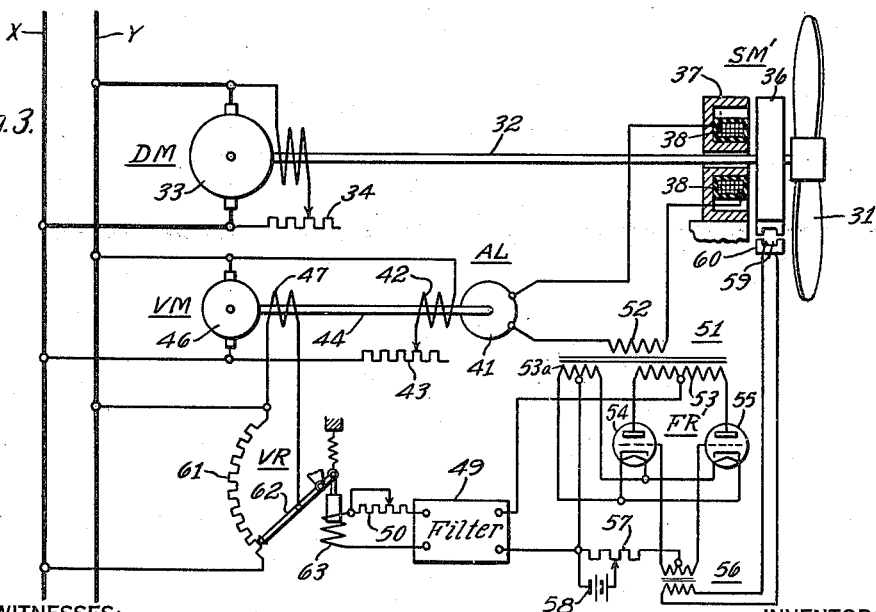
WITNESSES:
C. J. Weller.
Curt M. Avery
INVENTORS
Lee A. Kilgore and
Harry E. Criner.
BY Paul E. Friedemann
ATTORNEY Patented July 30, 1946

2,404,965

UNITED STATES PATENT OFFICE 2,404,965

OSCILLATION GENERATING SYSTEM

Lee A. Kilgore, Wilkinsburg, and Harry E. Criner, Forest Hills, Pa., assignors to Westinghouse Electric Corporation, East Pittsburgh, Pa., a corporation of Pennsylvania Application January 12, 1944, Serial No. 517,922

16 Claims. (Cl. 73—68)

Our invention relates to oscillation generating devices for exciting mechanical oscillating systems, for instance, in machines for testing structures as to vibratory strength, fatigue, soundness of texture or coherence, and the like mechanical determinants of quality.

The most common methods of exciting a resonant mechanical system to oscillations of large amplitude are based on the principle of self-excitation. Part of the energy of an oscillation is fed back through some type of amplifying system for producing an exciting force in phase with the oscillating motion so as to cause the system to continue oscillating at its natural frequency. It is also known that in a resonant system oscillations of large amplitude can be obtained by applying thereto a forcing frequency of a separate oscillator at a frequency very near to the natural frequency of the system.

Our invention, more specifically, relates to an oscillation generating device of the latter type and aims at improvements concerning the design, operation, and control of the forcing oscillator.

It is an object of the invention to provide a forced-excited oscillatory system in which the amplitude of the forcing energy can be regulated and varied within wide limits and up to very large amplitudes while maintaining the frequency of the exciting force sufficiently close to the natural frequency of the excited system to maintain resonance conditions.

Another object of the invention is to devise a system in which the frequency of the forced oscillations is automatically adjusted relative to the natural frequency of an excited oscillatory specimen structure so as to assume a tuned or approximately tuned vale regardless of differences in the resonance freqencies of different specimens to be excited by the same oscillation generator, and also for the purpose of requiring, as a rule, no action or attention by the operator as regards the proper tuning of the forced oscillations imposed on the specimens.

It is also an object of our invention to achieve the above-mentioned aims by means of an electrically operated drive of simple design and reliable operation and to render such drive readily applicable to the actuation and excitation of mechanical oscillatory systems which are subjected to unidirectional rotation when oscillating, as is the case with propellers for aircraft or ships, for instance.

Another object, allied to the foregoing, is to provide an oscillation generating device of the type mentioned in which rotary generators and motors, preferably of standard design, are used for imparting forced oscillations to the structure under observation.

Having these objects in mind and in accordance with the invention, we provide an oscillation generating device for exciting a mechanical oscillatory system by means of forced oscillations in which these oscillations are controlled separately as to amplitude and frequency. According to another feature of our invention, the frequency is controlled in dependence upon the power factor of the energy transmission between the separate oscillation generator and the oscillatory mechanical system excited thereby, this power factor being tantamount to the phase angle between the oscillatory velocity or motion and the oscillator force or torque of the energy transmission. More in particular, the present invention provides means for measuring the oscillatory velocity or a magnitude proportional thereto, and separate measuring means for measuring the force of the transmitted oscillations or a magnitude proportional thereto, in combination with control means which compare the two measured values with each other as to phase relation, and regulate the speed or frequency of the generator in a sense tending to maintain the phase angle at zero or within a range of low values near zero. In a more specific aspect of the invention, the just mentioned frequency control is obtained by providing an alternating-current generator (alternator) acting on a suitable magneto-motoric device, such as a synchronous motor, and driving the alternator by an electric variable speed motor whose field excitation is controlled by the above mentioned phase angle responsive control.

These and other objects and features of the invention will be more fully understood from the following description of the embodiments shown in the appertaining drawings, in which:

Fig. 2 is a schematic showing of a propeller testing machine designed in accordance with the invention;

Fig. 3 represents schematically another propeller testing machine also embodying the invention, while

Figure 1:
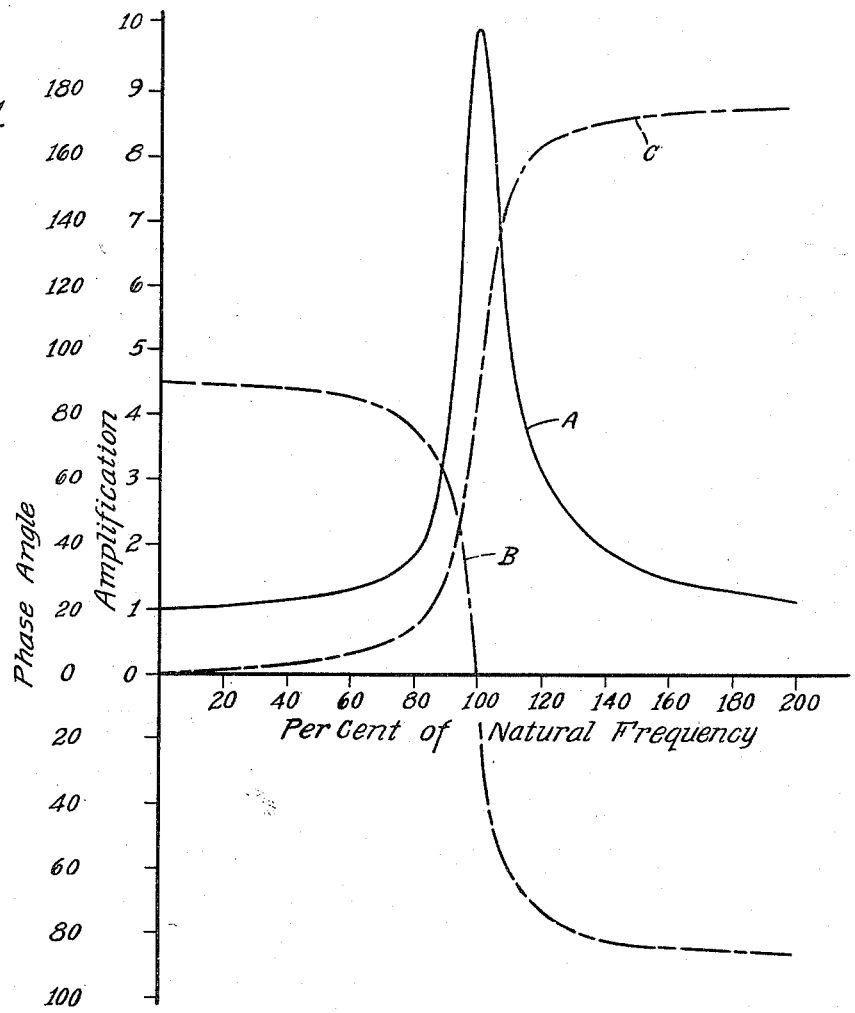
Figure 1 is an explanatory diagram elucidating the afore mentioned control principle.

Referring to Fig. 1, curve A exemplifies schematically the resonance characteristic of a mechanical oscillatory system, excited to vibrate at its natural frequency, by representing the amplification factor versus frequency, the latter being expressed in per cent of the natural frequency. The amplification factor is understood as the amplitude ratio of the excited and exciting (forced) vibrations. This factor reaches a maximum of about 10 at the natural frequency (100%) of the chosen example, this maximum value as well as the rate of change being determined by the damping of the oscillatory system. Curve B represents the phase angle between the oscillatory velocity and the oscillatory force applied to the resonant system. Curve C indicates the phase angle between the oscillatory force and the oscillatory displacement caused thereby in the excited system, both curves B and C showing the angle in degrees versus percentile frequency.

According to curve B, the phase angle between oscillatory velocity and exciting force passes through zero and hence changes its direction at the point (100%) of resonance. In a simple oscillatory system involving one mass and one elasticity (spring), the amplification (S) of the impressed force (I) is expressed by the equation $$S = \frac{I}{E}, \cos \theta$$

wherein E represents the oscillatory velocity and θ the phase angle between velocity (E) and force (I). The magnitude cos θ, in analogy to the corresponding phenomena in electric alternating-current circuits, is the "power factor" of the energy transmission from the oscillation generator to the oscillating system excited thereby.

While the above equation applies strictly to simple oscillatory systems, it represents also a sufficient approximation for more complicated resonant systems where the damping is not too large to suppress a characteristic resonance amplification. Hence, for all intended uses of this invention, the amplification near resonance is substantially inverse proportional to the phase angle and at a maximum when the phase angle passes through zero.

This being the case, Fig. 1 shows that it is possible to hold the amplitude of the excited oscillations within, for instance, 10% of the maximum by holding the phase angle (curve B) within about plus and minus 26°, or to hold the amplitude within 5% of its maximum by maintaining the phase angle within the limit of about plus and minus 18%. Consequently, a very accurate control of amplification can be obtained with a relatively broad control of the phase angle; and this phenomenon is taken advantage of by our invention for achieving an accurate control of the forcing oscillation generator by means of relatively simple operating and control devices.

In the propeller testing machine according to Fig. 2, the propeller structure 1, representing the mechanical oscillatory system to be excited in its natural frequency, is mounted on a shaft 2, which is driven by the armature 3 of a direct-current motor DM connected through a speed regulator 4 with exciter mains X and Y energized from a direct-current source of constant voltage. The speed adjustable motor DM permits driving the propeller 1 at the selected testing speed. The shaft 2 carries also the armature 6 of a synchronous motor SM which serves to superimpose on the unidirectional rotation of the shaft a torsional oscillation in order to excite the propeller structure to rotary oscillations during its continuous rotation. The field winding 8 of the synchronous motor SM is connected through a rheostat 9 with the mains X and Y.

An alternator AL has its armature 11 electrically connected with that of the synhcronous motor SM, while its field winding 12 is energized from the mains X and Y through an adjustable rheostat 13. A shaft 14 connects the generator armature 11 with the armature 16 of a variable speed motor VM whose armature current is also supplied from the mains X and Y. The field winding 17 of motor VM is likewise connected to the exciter mains X and Y, this connection being completed by the resistor 18 of a rheostat FR whose slider is operated through a suitable mechanical transmission 19 by a reversible rheostat motor RM whose armature is denoted by 21. Two field windings 22 and 23 are provided for exciting the armature to run in opposite directions, respectively. The armature and field windings of the rheostat motor RM are also connected to the excited mains X and Y.

A dynamometric relay DR with two control coils 24 and 25 at right angles to each other, so as to control a movable relay contact 26 in dependence upon the phase angle between the excitation of the two coils, serves to control the connection of the field windings 22 and 23 with the exciter means. That is, two stationary relay contacts 27 and 28 cooperating with the movable contact 26 energize either coil 22 or coil 23 when engaged by contact 26. The control coil 24 of the dynamometric relay is connected with the alternator circuit so as to be energized in accordance with the electric current fed to the synchronous motor SM. This current is substantially in phase with the oscillatory torque produced by the synchronous motor and superimposed on the rotation of shaft 2 and propeller 1.

The control coil 25 of the dynamometer DR is connected with the coil 29 of a torsional velocity meter TV whose magnet structure 30 has two poles adjacent to two axially spaced points of the driving shaft 2 and cooperating with two armatures (not shown) mounted on the shaft at these points. Torsional velocity meters of this type are known as such, and hence not further illustrated in detail. Any device for producing a voltage in proportion to a torsional velocity may be used for this purpose. Due to the just-mentioned connection, the dynamometer coil 25 receives an energizing voltage which varies in accordance with the torsional velocity of the propeller vibrations excited by the synchronous motor SM. Hence, the dynamometer contact 26 is controlled in dependence upon the phase angle between the exciting force or torque and the torsional motion or velocity caused thereby. Consequently, the control of relay contact 26 is governed by the power factor of the energy transmission from the generator of the forced oscillations to the oscillatory mechanical system excited by these forced oscillations. When this phase angle is zero or substantially zero, the relay contact 26 assumes an intermediate and inoperative position between the stationary contacts 27 and 28 so that both field windings 22 and 23 of rheostat motor RM are disconnected. Then the motor RM remains at rest, and the regulating rheostat FR maintains its adjustment.

When the oscillatory motion of the propeller is out of phase with the excited torque of the synchronous motor SM and hence the phase angle different from zero, the dynamometer contact 26 engages either contact 27 or 28 with the effect of causing the rheostat motor RM to change the adjustment of regulator FR in the direction required to return the phase angle to zero. More in detail, the change in adjustment of regulator FR has the effect of varying the excitation of the motor field winding 17 accordingly, thereby changing the driving speed of motor VM and hence the frequency of the alternating current supplied by the generator AL to the motor SM. In this manner, the system has the tendency to maintain the operating frequency of the synchronous motor SM in resonance with the natural frequency of the oscillatory system represented by the propeller structure 1.

The amplitude of the forced oscillations imparted to the propeller by the synchronous motor SM depends on the direct-current excitation of the generator field winding 12 and also on that of the motor field winding 8 and hence can be adjusted by means of the rheostats 13 and 9. Consequently, these two rheostats permit varying the amplitude of the forced oscillations. For small phase angles as occurring in a system designed in accordance with the principles set forth above, the control operation of the dynamometric device DR is nearly independent of the amplitude of the oscillations. Consequently, the rheostats 13 and 9 permit a change in the magnitude of the excited oscillations within very wide limits without affecting the desired automatic control operation. It will be understood that one of the rheostats 9 or 13 may be omitted or need not be varied for obtaining this result.

If the inertia of the alternator AL is sufficiently high, no anti-hunting devices need be employed. However, the system can also be provided with such devices in order to increase its accuracy of control.

In cases where the inertia of a dynamometer type control instrument is of such magnitude as to render the anti-hunting problem difficult, or where higher accuracy or ease of adjustment is desired, an electronic control system can be employed for determining the power factor. A system of the later type is exemplified by the diagram shown in Fig. 3.

According to Fig. 3, a propeller structure to be tested is mounted on a shaft 32 which is driven by a direct-current motor 33 fed from exciter mains X and Y through a speed regulating rheostat 34. An electromagnetic device SM' serves to impart axial oscillations to the propeller structure 31 during the rotation of the structure. The device has an armature 36 connected with the propeller for cooperation with a stator 37 whose magnetic body is provided with an energizing winding 38. This winding is connected with the armature 41 of an alternator AL whose field winding 42 is energized from the mains X and Y through a control rheostat 43 serving to adjust the voltage of the alternating current and hence the amplitude of the forced axial oscillations imparted to the rotating propeller.

The alternator armature 41 is mounted on the shaft 44 of the armature 46 of a variable speed motor VM. The armature circuit of this motor is connected with the mains X and Y while the field winding 47 is supplied with variable excitation from a voltage regulator VR, which, in turn, is controlled by a regulator FR' of the electronic type. This regulator contains two gaseous discharge tubes 54 and 55 of the type known under the name "Thyratron." A transformer 51 whose primary 52 is series-connected in the armature circuit of the alternator AL has a secondary 53 tapped in its midpoint for supplying the tubes 54 and 55 with plate current. The voltage of this current depends on the excitation of the primary 52, which, in turn, is a measure of the alternator current and hence of the force of the oscillations imposed on the propeller by the electromagnetic device SM'. Another primary 53a also having a tapped mid-point is connected with the cathodes of the tubes 54 and 55 in order to supply the heating current thereto. It will be understood, however, that any other suitable source of heating current may be employed instead. The grids of tubes 54 and 55 are connected with the terminals of the secondary winding of a transformer 56 whose primary is connected with the voltage coil 59 of a measuring device 60, which in coaction with the armature 36 generates a voltage in proportion to the velocity of the oscillatory motion transmitted to the propeller structure. The midpoint of the secondary of transformer 56 is connected with the mid-point of winding 53a of transformer 51 in order to complete the grid control circuit of the gas discharge tubes. The connection contains a potentiometer 57 in combination with a voltage source 58 for providing an adjustable grid bias. The output circuit of the electronic regulator is connected with the above-mentioned voltage regulator VR. If desired, a filter 49 and a calibrating rheostat 50 may be interposed in the input circuit of the voltage regulator. As will be explained hereinafter, the output current of the electronic network FR' is a measure of the phase angle or power factor of the oscillatory energy transmission between the oscillation generator and the propeller structure. The voltage regulator VR serves to supply the field winding 47 of the variable speed motor VM with excitation in dependence upon the tube ouput current.

Different types of voltage regulators suitable for this purpose are known as such. In the illustrated example, a potentiometer resistor 61 is connected across the mains X and Y and has a slider 62 which is biased in the upward direction by a spring and connected with an armature which is attracted by a control coil 63 to move in the downward direction, this control coil being excited by the tube output current. The field winding 47 is connected with the slider 62 and with one terminal of the potentiometer resistor 61. Consequently, the voltage imposed on field winding 47 depends on the adjustment of the slider 62, which, in turn, is controlled by the plate current of the tubes.

Due to the fact that the voltage supplied by the transformer secondary 53 to the plate circuit of the tubes 54 and 55 maintains a fixed phase relation to the alternator output current and hence to the axial force of the forced oscillations imparted to the propeller, while the grid voltage of the tubes varies in a fixed relation to the oscillatory axial motion of velocity caused by these forced oscillations, the output current supplied to the voltage regulator VR can be so adjusted as to represent a measure of the power factor in accordance with the principle explained in the foregoing. By selecting a proper grid bias with the aid of the elements 57 and 58, an output current can be obtained whose average value for small angular differences varies more than proportionately with the angular displacement. Hence, if the frequency of the alternator AL, i. e. the speed of its driving motor VM, is adjusted to give a constant voltage output, a constant small angular displacement is maintained, thus holding the frequency of the forced oscillations close to resonance with the natural frequency of the propeller structure. If the grid bias is kept small compared with the amplitude of the grid voltage, the phase angle is not appreciably affected by changes in amplitude. Hence, the control rheostat 43 can be adjusted at will within wide limits, thereby changing the amplitude of the excited oscillations accordingly, without affecting the desired control function of the system.

Figure 4:
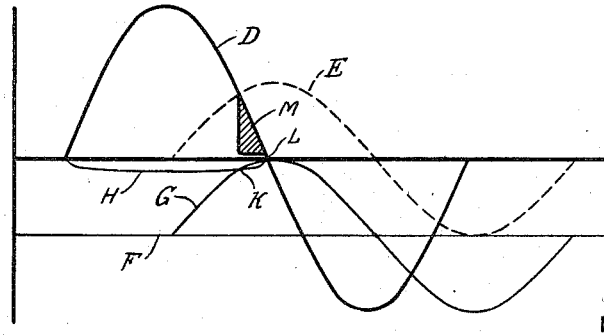
Fig. 4 is an explanatory diagram relating to the operation of the machine shown in Fig. 3.

The foregoing explanation will be more fully understood from a reference to the voltage characteristics shown in the diagram of Fig. 4 and relating to the operation of either electronic tube. Curve D represents the plate voltage of the tube supplied by transformer 51, while curve E exemplifies the grid voltage supplied by transformer 56. The line F indicates the constant grid bias applied to the grid circuit by means of the voltage source 58. The resultant grid voltage representing the sum of voltages E and F at any instant is denoted by curve G. The critical grid voltage of the tube corresponds to curve H. Hence, under the operating conditions represented by Fig. 4, the tube is ignited at the moment corresponding to the intersection K of curves H and G. In this moment, the tube is rendered conductive until the plate voltage D passes through zero at the instant denoted by point L. The output current supplied to the voltage regulator VR is in accordance with the area marked M. It will be seen that any change in the phase relation of the plate voltage D and the voltage component E of the grid voltage will displace the breakdown moment K and hence result in a larger or smaller output current. By properly adjusting the tube circuits, the output current can be reduced to zero when the voltages D and E have a phase displacement at which the output current is zero.

It will be understood from the foregoing that an electronic system of the type described can also be used for exciting torsional rather than axial vibrations of the rotating oscillating structure. Furthermore, a torsional excitation of vibrations can be readily combined with a system for producing simultaneous axial vibrations. It should also be understood that the principles of our invention as set forth in the foregoing are applicable for exciting oscillatory mechanical systems of a type different from the rotating propeller structures referred to in the above described examples. In particular, an electronic control system for regulating a phase angle between two alternating quantities, by comparing a voltage proportional and in definite phase relation to one quantity with a voltage proportional and in definite phase relation to the other can be applied in cases other than the testing of oscillatory systems.

In view of the possibilities of modifying the systems of the type described without departing from the objects and essential features of the invention, we wish this specification to be understood as illustrative rather than in a limiting sense.

We claim as our invention:

1. An oscillation generating device for exciting a mechanical oscillatory system, comprising electric means for imparting forced oscillations to said system, an alternating-current generator for energizing said means, a variable speed motor in driving connection with said generator, an electric network connected with said motor for controlling its speed, and phase angle responsive control apparatus disposed in said network and having means for producing a component control magnitude in accordance with the oscillatory velocity of the imparted oscillations and means for producing a component control magnitude in accordance with the force effecting said oscillations so as to maintain said motor at a speed corresponding approximately to the zero value of the phase angle between said two magnitudes.

2. An oscillation generating device for exciting a mechanical oscillatory system, comprising electric means for imparting forced oscillations to said system, an alternating-current generator for energizing said means, a variable speed motor in driving connection with said generator, an electric network connected with said motor for controlling its speed, and phase angle responsive control apparatus disposed in said network and having means for producing a component control magnitude in accordance with the oscillatory velocity of the oscillations of said system and means for producing a component control magnitude in accordance with the current supplied by said generator to said electric means in order to maintain said motor at a speed corresponding approximately to the zero value of the phase angle between said two magnitudes.

3. An oscillation generating device for exciting a rotatable oscillatory system, comprising a drive for rotating said system in a given direction, an alternating-current motor connected with said drive for superimposing oscillations on said rotating system, an alternating-current generator for energizing said motor, a variable speed motor in driving connection with said generator, and electric control means connected with said motor and having means responsive to the phase angle between the oscillations introduced by said motor and the oscillations of said system caused by said introduced oscillations so as to maintain said variable speed motor substantially at a speed corresponding to the zero value of said phase angle.

4. An oscillation generating device for exciting a rotatable oscillatory system, comprising a drive for rotating said system in a given direction, an alternating-current motor connected with said drive for superimposing oscillations on said rotating system, an alternating-current generator for energizing said motor, a variable speed motor in driving connection with said generator, an electric network connected with said latter motor for controlling its speed, and phase angle responsive control apparatus disposed in said network and having means for producing a component control magnitude in accordance with the oscillatory velocity of the superimposed oscillations and means for producing a component control magnitude in accordance with the force effecting said superimposed oscillations in order to maintain said variable speed motor at a speed corresponding substantially to the zero value of the phase angle between said component magnitudes.

5. An oscillation generating device for exciting a rotatable oscillatory system, comprising a drive for rotating said system in a given direction, a synchronous motor connected with said drive for superimposing oscillations on said rotating system, an alternating-current generator for energizing said synchronous motor, a variable speed motor in driving connection with said generator, an electric network connected with said latter motor for controlling its speed, and phase angle responsive control apparatus disposed in said network and having means for producing a component control magnitude in accordance with the oscillatory velocity of the oscillations of said system and means for producing a component control magnitude in accordance with the current supplied by said generator to said synchronous motor in order to maintain said variable speed motor at a speed corresponding substantially to the zero value of the phase angle between said component magnitudes.

6. An oscillation generating device for exciting a mechanical oscillatory system, comprising electric means for introducing mechanical oscillations into said system, an alternating-current generator for energizing said means, electric control means for adjusting the amplitude of the energization of said means, a variable speed motor in driving connection with said generator, and electric control means connected with said motor and having means responsive to the phase angle between said introduced oscillations and the oscillations of said system caused by said introduced oscillations in order to maintain said motor substantially at a speed corresponding to the zero value of said phase angle.

7. An oscillation generating device for exciting a mechanical oscillatory system, comprising electric means for imparting forced oscillations to said system, an alternating-current generator for energizing said means, a variable speed motor in driving connection with said generator, a speed control network connected to said motor, a dynamometric control relay forming part of said network and having two control coils and a contact element movable in response to changes in phase angle between the energization of said coils respectively, one of said coils being connected to said generator and electric means so as to be energized in accordance with the generator current, and means responsive to the velocity of the oscillations of said system caused by said electric means and being connected with said other coil for energizing it in accordance with said velocity whereby said motor is maintained at a speed corresponding substantially to the zero value of said phase angle.

8. An oscillation generating device for exciting a mechanical oscillatory system, comprising electric means for introducing mechanical oscillations into said system, an alternating-current generator for energizing said means, a variable speed motor having a speed controlling field winding and being connected with said generator for driving the latter, electric control means connected to said field winding for energizing it and containing means responsive to changes in the power factor of the energy transmission between said introduced oscillations and the resulting oscillations of said system so as to maintain said motor substantially at a speed corresponding to the unity value of said power factor.

9. A device for exciting oscillations in a rotating structure, comprising a drive for driving said structure in a given direction of rotation, a synchronous motor connected with said structure for causing it to oscillate during its rotation, an alternator for energizing said motor, a variable speed motor having a speed controlling field winding and being connected with said alternator for driving the latter, an electric energizing circuit connected with said field winding, means for supplying variable voltage in response to the oscillatory speed of the transmitted oscillations and control means responsive to the current supplied by said alternator to said synchronous motor, said voltage supply means and said control means being connected with said circuit so as to vary the energization of said field winding in dependence upon the phase angle between said voltage and said current in order to maintain said phase angle substantially at the zero value.

10. A device for exciting oscillations in a rotating structure, comprising a drive for driving said structure in a given direction of rotation, a synchronous motor connected with said structure for causing it to oscillate during its rotation, an alternator for energizing said motor, a variable speed motor having a speed controlling field winding and being connected with said alternator for driving the latter, an electric energizing circuit connected with said field winding and containing a variable circuit member for varying the energization of said winding, a reversible motor for adjusting said circuit member, a dynamometric relay for controlling said reversible motor, means for supplying variable voltage in response to the oscillatory speed of the transmitted oscillations and control means responsive to the current supplied by said alternator to said synchronous motor, said voltage supply means and said control means being connected with said relay, whereby the energization of said field winding is controlled in dependence upon the phase angle between said voltage and said current in order to maintain said phase angle substantially at the zero value.

11. An oscillation generating device for exciting a mechanical oscillatory system, comprising electric means for introducing oscillations into said system, an alternating-current generator for energizing said means, a variable speed motor in driving connection with said generator, and electric control means responsive to the phase angle between said introduced oscillations and the resulting oscillations of said system, said control means being connected with said motor so as to maintain said motor substantially at a speed corresponding to the zero value of said phase angle.

12. An oscillation generating device for exciting a mechanical oscillatory system, comprising electric means for imparting forced oscillations to said system, an alternating-current generator for energizing said means, a variable speed motor in driving connection with said generator, and electric control means connected with said motor and being responsive to the phase angle between the electric oscillations generated by said generator and the resulting oscillations of said system so as to maintain said motor substantially at a speed corresponding to the zero value of said phase angle.

13. An oscillation generating device for exciting a mechanical oscillatory system, comprising electric means for introducing oscillations into said system, an alternating-current generator for energizing said means, a variable speed motor in driving connection with said generator, a speed control network connected to said motor and containing a rheostat for varying the field energization of said motor, an auxiliary reversible motor for adjusting said rheostat, and a dynamometric control relay for controlling said reversible motor, said relay being connected with said electric means and said oscillatory system so as to respond to changes in the phase angle between said introduced oscillations and the oscillations of said system caused by said introduced oscillations, in order to control the speed of said variable speed motor so as to maintain said phase angle substantially at the zero value.

14. A device for exciting a mechanical oscillatory system, comprising electromagnetic drive means for transmissing torsional oscillations to said system, an alternator for energizing said drive means, a variable speed motor for driving said alternator, electronic tube network connected to said motor for controlling its speed and having a plate circuit and a grid circuit, measuring means responsive to the oscillatory velocity of the oscillations caused in said system by said transmitted oscillations, said measuring means being connected with one of said circuits, and means for controlling said other circuit in accordance with the torque of said transmitted oscillations in order to vary said speed in dependence upon the phase angle between said velocity and said torque so as to maintain said phase angle substantially at the zero value.

15. A device for exciting a mechanical oscillatory system, comprising electromagnetic drive means for transmitting torsional oscillations to said system, an alternator for energizing said drive means, a variable speed motor disposed for driving said alternator, a control network connected with said motor for controlling the motor speed, said network having a gaseous discharge tube provided with a plate circuit and a grid circuit, means connected with said grid circuit for controlling said tube in accordance with the oscillatory velocity of the oscillations caused in said system by said transmitted oscillations, and means for energizing said plate circuit in accordance with the torque of said transmitted oscillations in order to vary said speed in dependence upon the phase angle between said velocity and said torque so as to maintain said phase angle substantially at the zero value.

16. With a machine for testing propellers having a shaft for accommodating the propeller to be tested and a motor for driving said shaft, in combination, a synchronous motor connected with said shaft for imposing torsional oscillations thereon, an alternator for energizing said synchronous motor, a variable speed motor for driving said alternator, control means responsive to the torsional velocity of said shaft, control means responsive to the torsional torque applied by said synchronous motor to said shaft, and electric circuit means connected with said variable speed motor and both said control means for controlling the motor speed in dependence upon the phase angle between said velocity and said torque in order to maintain said phase angle substantially at the zero value.

LEE A. KILGORE.
HARRY E. CRINER.